United States Patent [19]                [11]     4,251,064
Camilleri                                    [45]   Feb. 17, 1981

[54] SHOCK ABSORBER

[75] Inventor: Thomas M. Camilleri, Brooklyn, N.Y.

[73] Assignee: Sycam Advanced Technology Corp., Brooklyn, N.Y.

[21] Appl. No.: 24,947

[22] Filed: Mar. 29, 1979

[51] Int. Cl.³ .............................................. F16F 3/00
[52] U.S. Cl. .................................... 267/136; 188/1 B
[58] Field of Search .................. 188/1 B, 1 C; 267/4, 267/166, 170, 136; 213/44

[56]           References Cited
         U.S. PATENT DOCUMENTS 2,141,697  12/1938  Russell .............................. 188/1 B X
2,372,214   3/1945  Loepsinger ....................... 188/1 B X
3,228,492   1/1966  Blumrich ............................. 188/1 C Primary Examiner—Duane A. Reger
Attorney, Agent, or Firm—Donald J. Perrella

[57]             ABSTRACT

A shock absorber having controlled, continuous, adjustable resistance in both directions is obtained by means of a slide piston passing through a fixed collar and through two movable collars and elastic compression means abutting each movable collar.

8 Claims, 2 Drawing Figures

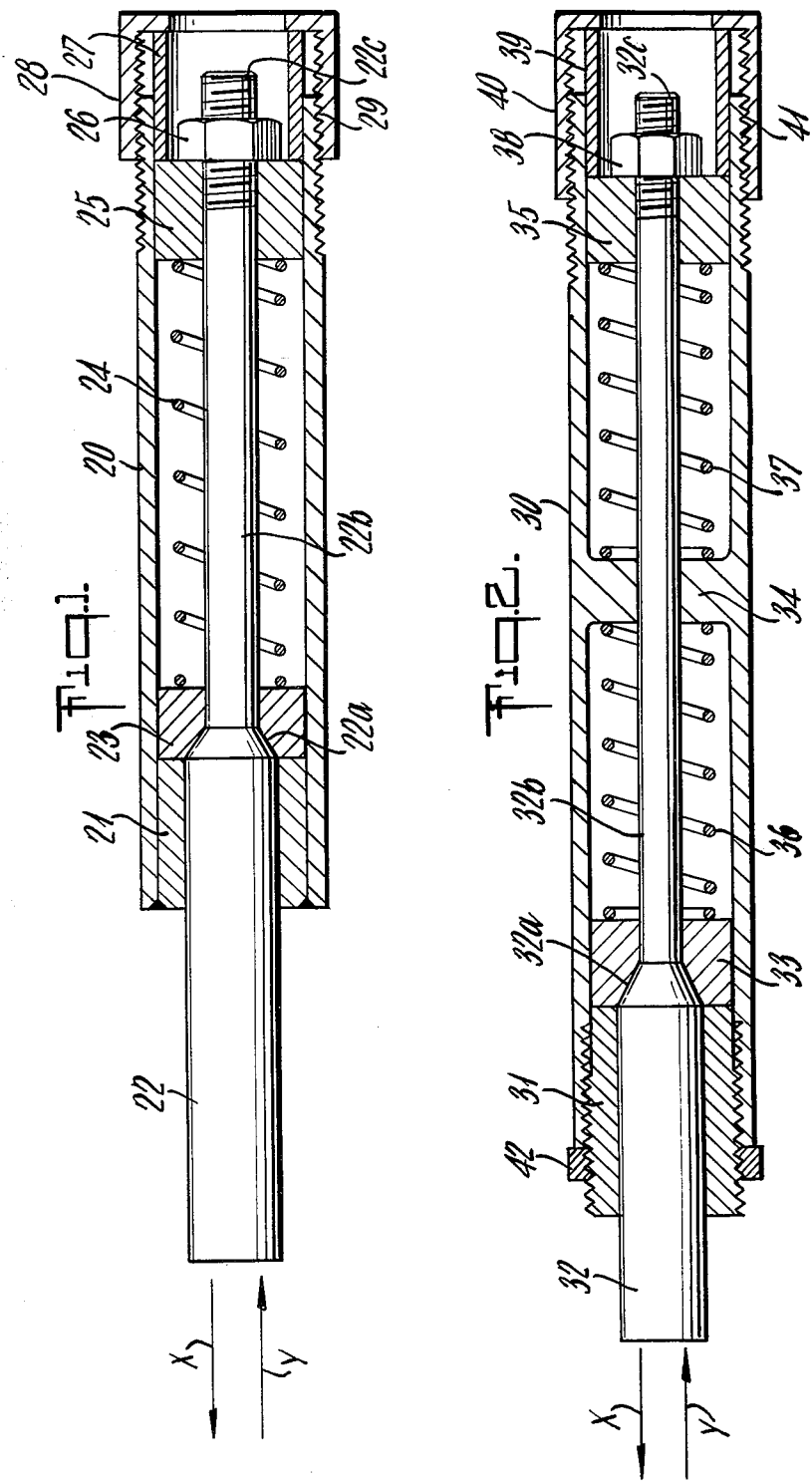

SHOCK ABSORBER

OBJECTS OF THE INVENTION

It is an object of the present invention to provide a shock absorber having controlled, continuous resistance in both directions. Another object is to provide a shock absorber which always tends to return to its equilibrium position or to a position of zero shock force. Still another object is to provide an adjustable shock absorber wherein the force in either direction is always equal after adjustment. A further object is to provide a shock absorber having equal or variable force in each direction. These and other objects of the present invention will be apparent from the following description.

SUMMARY OF THE INVENTION

A shock absorber having controlled, continuous, adjustable resistance in both directions is obtained by means of a slide piston passing through a fixed and through two movable collars and elastic compression means abutting each movable collar.

BRIEF DESCRIPTION OF THE DRAWINGS

FIG. 1 is a cross-section view of a shock absorber of the present invention having single compression means.

FIG. 2 is a cross-section view of a shock absorber of the present invention having dual compression means.

DETAILED DESCRIPTION

As shown in FIG. 1, one embodiment of the present invention consists of a casing 20 having a stop collar 21 fixed to the inner surface at one end of casing 20. Slide piston 22 having a conically tapered mid-section 22a and a narrowed end section 22b passes into casing 20 through collar 21 and movable collar 23. Tapered mid-section 22a engages movable collar 23 having a conically tapered surface complementary to that of mid-section 22a. The front-section 22b of piston 22 passes through spring 24 which is held between movable collar 23 and a second movable collar 25. A lock nut 26 is secured to threaded end 22c of piston 22. Movable stop collar 27 adapted to contact movable collar 25 is slidably mounted within the inner surface of casing 20. An adjustment cap 28 is screwed on the end of casing 20 to prevent any backward movement of stop collar 27.

In operation, when a force in direction of arrow X is applied to slide piston 22, collar 25 compresses spring 24 against collar 23 which is being held by stop collar 21. Further movement of collar 25 causes spring 24 to be compressed between collars 25 and 23. When a force in the direction of arrow Y is applied to slide piston 22, collar 23 compresses spring 24 against collar 25 which is being held by stop 27 which is held by cap 28. Further movement of collar 23 causes spring 24 to be compressed between collars 23 and 25. Cap 28 optionally has an end opening as shown to allow piston 22 to protrude therefrom in response to movement caused by a force in the direction of Y. This permits the casing 20 to be shorter than would be the case if the piston were to be totally enclosed during its travel. Because the same spring 24 is being compressed in either direction X or Y, the force required to move piston 22 in either direction is identical. Adjusting the compression on spring 24 increases or decreases the compression force equally in each direction. A lock nut (not shown) may be fastened to threaded portion of casing to keep cap 28 in position.

As shown in FIG. 2, another embodiment of the present invention consists of a casing 30 having an adjustable stop collar 31 disposed in the inner surface of one end of casing 30. Slide piston 32 having a conically tapered mid-section 32a and a narrowed end section 32c passes into casing 30 through collar 31, movable collar 33, fixed collar 34 and movable collar 35. Tapered mid-section 32a engages movable collar 33 having a conically tapered section complementary to that of mid-section 32a. Slide piston 32 also passes through spring 36 which is held between movable collar 33 and fixed collar 34, and through spring 37 which is held between movable collar 35 and fixed collar 34. A lock nut 38 is secured to threaded end 32c of piston 32. A movable stop 39 adapted to contact movable collar 35 is slidably mounted within the inner surface of casing 30. An adjustment cap 40 is screwed on threads 41 on the end of casing 30. Lock nut 42 holds stop collar 31 in position in casing 30.

Each compression spring operates independently of the other. That is to say, if spring 36 were removed, it would have no effect on the resistance force in direction of arrow X. Of course, without spring 36 there would be absolutely no resistance to force in direction of arrow Y. Likewise, if spring 37 were removed, it would have no effect on the resistance force in direction of arrow Y. Of course, without spring 37 there would be absolutely no resistance to force in direction of arrow X.

In operation when a force in direction of arrow X is applied to slide piston 32, collar 35 is pulled toward fixed collar 34 thereby compressing spring 37 between collars 35 and 34. To adjust compression spring 37, lock nut 38 may be tightened or loosened. When the desired resistance is obtained stop slide collar 39 abuts slide collar 35 and adjustment cap 40 is adjusted to abut slide collar 39.

When a force in direction of arrow Y is applied to piston slide 32, collar 33 is moved toward fixed collar 34 thereby compressing spring 36 between collars 33 and 34. Stop collar 31 is moved toward or away from collar 33, to increase or decrease resistance to force in direction of arrow Y. Because each spring can be adjusted independently, the force resisting each stroke can be equal or unequal as desired.

It is to be understood that while the present invention has been described with reference to compression means, any equivalent elastic force-absorbing means, e.g., tension means, may equally be used. Also, the objects of the present invention can be accomplished with two compression means, or with two tension means, or with one tension means and one compression means. The compression or tension means, as the case may be, can be springs or another compressible material such as, for example, natural or synthetic rubber or functionally equivalent elastomeric material, such as, for example, a urethane elastomer.

What is claimed is:

1. A shock absorber having continuous, adjustable resistance in both directions comprising a slide piston passing through a fixed collar and through two movable collars, and a single elastic force-absorbing means disposed between and abutting each movable collar, the slide piston having a frusto-conical taper adapted to fit within a complementary frusto-conical recess within one of the two movable collars.

2. A shock absorber having continuous, adjustable resistance in both directions comprising a slide piston passing through two movable collars and through a fixed collar disposed between the two movable collars, a separate elastic force-absorbing means disposed between each movable collar and the fixed collar, the movement of the piston in one direction engaging only one movable collar and being resisted by only one of the separate elastic force-absorbing means, and the movement of the piston in the opposite direction engaging the other movable collar and being resisted by only the other separate elastic force-absorbing means.

3. A shock absorber according to claim 2 wherein the slide piston has a frusto-conical taper and one movable collar has a complementary frusto-conical recess.

4. A shock absorber according to claim 1 wherein the force-absorbing means are elastic compression means.

5. A shock absorber according to claim 1 wherein the force-absorbing means are elastic tension means.

6. A shock absorber according to claim 2 wherein the force-absorbing means are elastic compression means.

7. A shock absorber according to claim 2 wherein the force-absorbing means are elastic tension means.

8. A shock absorber according to claim 2 wherein the force-absorbing means are independently adjustable so that the force resisting movement in one direction can be equal or unequal to the force resisting movement in the opposite direction.

* * * * *